United States Patent [19]

Hemmelgarn et al.

[11] Patent Number: 4,887,360
[45] Date of Patent: Dec. 19, 1989

[54] WAY BEARING ARRANGEMENT FOR A HORIZONTAL ARM COORDINATE MEASURING MACHINE

[75] Inventors: Thomas L. Hemmelgarn, Dayton; Freddie L. Raleigh, Centerville, both of Ohio

[73] Assignee: The Warner & Swasey Company, Cleveland, Ohio

[21] Appl. No.: 359,062

[22] Filed: May 30, 1989

Related U.S. Application Data

[63] Continuation-in-part of Ser. No. 305,598, Feb. 3, 1989.

[51] Int. Cl.⁴ .............................................. G01B 7/03
[52] U.S. Cl. .................................... 33/503; 33/1 M
[58] Field of Search ................ 33/503, 1 M, 556, 572

[56] References Cited

U.S. PATENT DOCUMENTS

| | | | |
|---|---|---|---|
| 4,175,327 | 11/1979 | Herzog | 33/503 |
| 4,229,866 | 10/1980 | Berthier . | |
| 4,305,207 | 12/1981 | Lantz | 33/503 |
| 4,495,703 | 1/1985 | Sakata et al. | 33/503 |
| 4,594,791 | 6/1986 | Brandstetter . | |
| 4,610,089 | 9/1986 | Bell et al. . | |
| 4,630,374 | 12/1986 | Raleigh . | |
| 4,630,381 | 12/1986 | Sakata et al. | 33/503 |
| 4,682,418 | 7/1987 | Tuss et al. | 33/1 M |
| 4,727,653 | 3/1988 | Fujitani et al. . | |
| 4,790,078 | 12/1988 | Schneider | 33/503 |

FOREIGN PATENT DOCUMENTS 0518161 6/1976 U.S.S.R. .
0621955 8/1978 U.S.S.R. .

Primary Examiner—William A. Cuchlinski, Jr.
Assistant Examiner—Christopher W. Fulton
Attorney, Agent, or Firm—John R. Benefiel; Raymond J. Eifler

[57] ABSTRACT

A bearing arrangement for a coordinate measuring machine having a horizontal probe arm assembly (16) extending to the front of the machine and supported for movement along X,Y, and Z orthogonal axes. The bearing arrangement comprised of opposing sets of supporting or guiding and preloading air bearings (48a,b; 46a,b; 66a,b; 64a,b; 76a,b; 78a,b) for the X carriage (40), the YZ carriage (17) (178a,b; 180a,b; 182a,b; 184a,b; 204a,b), and for the probe shaft (186) (188a,b; 190a,b; 192a,b1-94a,b). The air bearings each ride on way surfaces formed on the base (12) a column member 160, and the probe shaft (186) and are arranged to most efficiently distribute the load and minimize the effects of inaccuracies in the way surfaces, and make more efficient the accurate machining of the way surfaces.

12 Claims, 6 Drawing Sheets

WAY BEARING ARRANGEMENT FOR A HORIZONTAL ARM COORDINATE MEASURING MACHINE

CROSS REFERENCE TO RELATED APPLICATION

This application is a continuation in part of Ser. No. 07/305,598 filed on Feb. 3, 1989.

This invention concerns coordinate measuring machines of the type including a probe mounted on a shaft extending horizontally above a measuring table. In such machines the probe is movable along three orthogonal axes to enable measurements to be conducted by the generation of electrical signals corresponding to the extent of movement along each axis.

The probe arm is movably mounted along its own (Z) axis, extending horizontally from a (YZ) carriage. The YZ carriage is in turn movable up and down along a vertical or Y axis by virtue of being movably supported on a rigid column attached to an X carriage. The X carriage is supported on a base for movement along a horizontal (X) axis orthogonal to each of the Y and Z axes.

As the horizontal probe arm moves in and out, prior art bearing arrangements create unbalanced reversing loads as the probe is overhung on one side or the other of the column, tending to twist or skew the arm.

It is critical that precisely guided, friction free movement of these respective elements occur, and that out of parallel conditions of the various ways be avoided, while allowing manufacturing of the machine at a reasonable cost. The prior art bearing arrangements have not accomplished these requirements in an entirely satisfactory manner.

SUMMARY OF THE INVENTION

The present invention comprises a horizontal arm coordinate measuring machine characterized by particular bearing arrangements for each of the X-carriage, YZ carriage, and probe arm. The X carriage bearing arrangement comprises front and rear spaced pairs of load carrying air bearings, the rear pair spaced closely together to approximate a three point support to have the advantage of minimizing the effect of slight out of parallel conditions of the X axis front and rear ways. Each of the load carrying air bearings is preloaded by a corresponding preload bearing located upwardly facing against a lower way surface.

A lengthwise extending fixed central rail has opposite vertical surfaces extending along the X axis and engaged on one side by pair of X-axis guide air bearings and on the opposite side by a pair of preloading X-axis guide air bearings, all mounted on the X-carriage.

The column is formed with vertically extending pairs of parallel way surfaces on wings extending from either side and an intermediate guide rib projecting normally thereto having parallel guide surfaces. Upper and lower spaced pairs of load and preload air bearings engage on the wing and the guide rib way surfaces and a single pair of load and preload air bearings engage the other wing way surfaces. Each of the closely spaced pairs of way surfaces are relatively easy to machine in close parallelism, and the rib can be sized wide enough to provide support for large diameter air bearings needed to afford adequate support.

The probe arm comprises an elongated probe shaft, square in section and oriented to create a diamond shaped series of horizontal way surfaces, with horizontally spaced pairs of air bearings engaging these ways adjacent the right and left corners. This arrangement of bearings on the probe shaft has the advantage of preventing unbalanced load reversals and eliminates any tendency to roll or yaw the probe shaft as it moves in and out on the YZ carriage, while keeping the geometry of the probe shaft relatively simple.

DETAILED DESCRIPTION

In the following detailed description, certain specific terminology will be employed for the sake of clarity and a particular embodiment described but it is to be understood that the same is not intended to be limiting and should not be so construed inasmuch as the invention is capable of taking many forms and variations within the scope of the appended claims.

Figure 1:
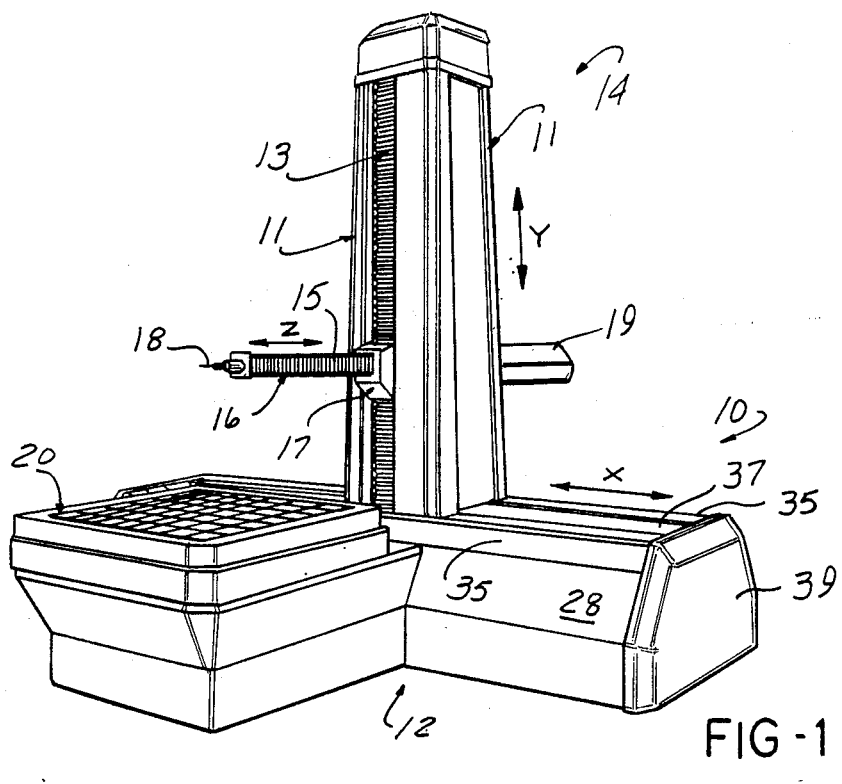
FIG. 1 is a perspective view of a horizontal arm coordinate measuring machine according to the present invention.

FIG. 1 illustrates a horizontal arm type coordinate measuring machine 10, with the various components enclosed by a cover system as descrbed in detail in copending U.S. application Ser. No. 07/331,727 filed on Apr. 3, 1989. Such cover system includes upstanding column covers 11 defining a gap covered by pleated curtains 1. The probe arm assembly 16 is enclosed with a bellows 15 at the front and a hard cover 19 at the rear.

Such coordinate measuring machine 10 includes a tee shaped base 12 on which is supported a vertical column assembly 14 attached to an X-axis carriage (not shown in FIG. 1), movable along a first horizontal coordinate axis, referred to herein as the X-axis. The vertical column assembly 14 in turn movably supports a horizontal arm assembly 16 having a probe tip 18 affixed thereto. The horizontal arm assembly 16 is carried on a YZ carriage 17 movable vertically on the column assembly 14 along a second coordinate axis, referred to herein as the Y-axis. The probe arm assembly 16 is movable on the YZ carriage 17 horizontally, along a third or Z axis parallel to the lengthwise axis of the arm 16, with each of the X, Y, and Z axes orthogonal to each other in the manner well known in the art.

The base 12 also supports a rotary table 20 on which a workpiece to be measured (not shown) may be disposed so as to be accessible for inspection by movement of the probe tip 18 to points of interest thereon.

Since such horizontal coordinate measuring machines are generally well known, the details are not here described save in connection with the present invention, which involves bearing arrangements for the X-axis carriage on the base (12), the YZ carriage (17) on the column assembly 14, and the probe arm assembly 16 on the YZ carriage 17.

Figure 2:
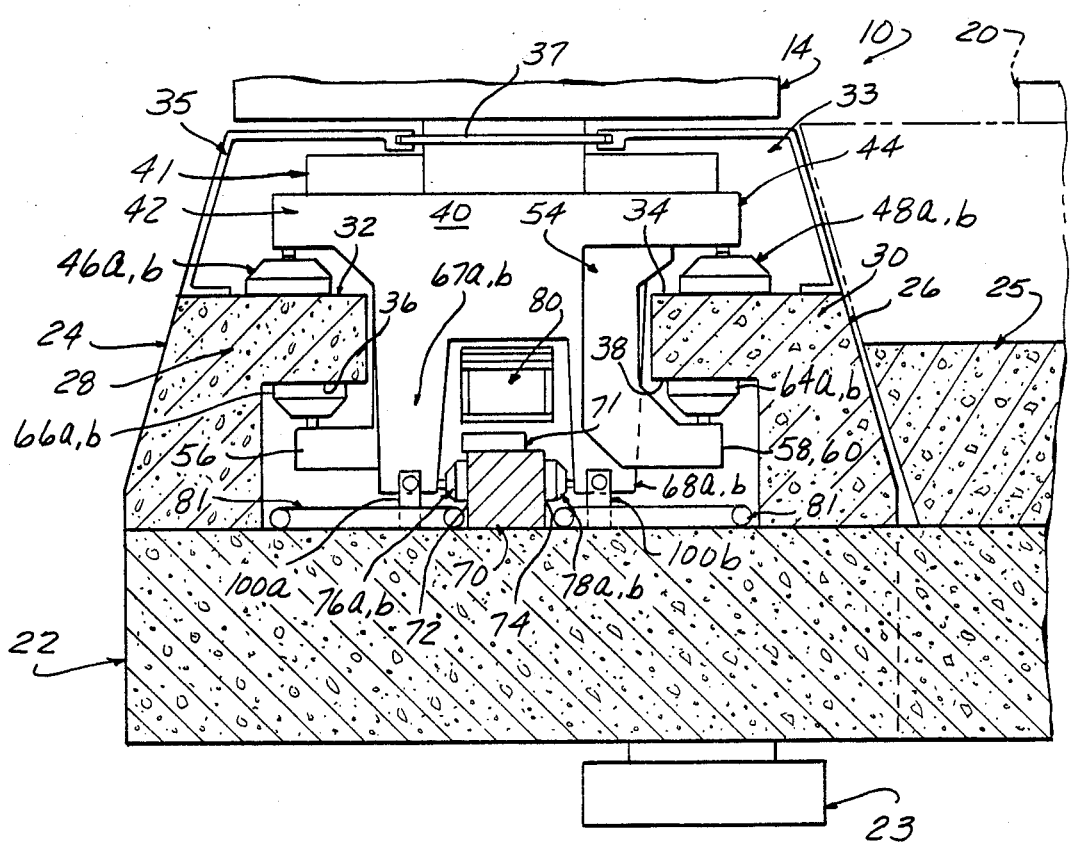
FIG. 2 is a transverse sectional view taken across the base of the machine shown in FIG. 1.

FIG. 2 illustrates details of the X-axis way arrangement which includes the base 12, preferably constructed of a granite slab 22 supported on pneumatic isolators 23. Detachably mounted to the base 12, as by bolts and adhesive (not shown) are a pair of spaced apart upstanding way members 24, 26, each elongated and extending parallel to each other along the X-axis. The way members 24, 26 are each angled inwardly along the upper ends and have opposing overhang portions 28, 30. The top surface of overhang portions 28, 30 are machined to provide accurate upper horizontal way surfaces 32, 34, while the lower opposite surfaces provide undersurface horizontal ways 36, 38 directly beneath the upper way surfaces 32, 34.

An X-axis carriage 40 supports the column assembly 14, attached by a mounting plate 41, and enables linear movement along the X-axis. The carriage 40 is disposed in the space between the angled way members 24, 26. The X-axis carriage 40 is comprised of a machine aluminum casting having integral first portions comprised of outwardly extending wing flanges 42, 44 each overlying a respective one of the upper horizontal ways 32, 34.

An angled cover plate 35 is attached atop each way member 24, 26, and together with a movable dust belt 37 and end caps 39 completely enclose the interior space 33.

Interposed between the flanges 42, 44 and the ways 32, 34, are pairs of support air bearings, rear 46a,b and front 48a,b each bearing in the pairs spaced apart from each other on the X-axis carriage 40 in the direction of the X-axis.

The X-axis carriage 40 is formed with second portions comprising a rear bearing support bracket 50, and right and left front bearing support brackets 52, 54, extending down from the bottom of the X-axis carriage 40 into the space between the way members 28, 30, each bracket 50, 52, 54 having end portions 56, 58, 60 respectively extending outwardly beneath the undersurface horizontal ways 36, 38. Interposed therebetween are pairs of preloading air bearings, rear 66 a,b, and front 64 a,b, each bearing in the pair spaced apart in the direction of the X-axis and located in rough alignment beneath a corresponding support air bearing 46a, or 46b; 48a, or 48b.

The X-axis carriage 40 is also formed with integral third portions comprised of a pair of laterally spaced guide bearing legs 67a,b; 68a,b straddling a guide rail 70 attached to the surface of the base 12. The guide rail 70 is preferably also constructed of granite and is of narrow width to minimize the effect of differences in thermal growth from the aluminum X axis carriage 40. A steel transducer grating spar 71 is attached to the top of the guide rail 70 in a manner so as to allow relative thermal expansion therebetween, such as by a pin and slot connection (not shown).

Either side of the guide rail 70 is formed with a vertically extending guide surface 72, 74, parallel to the X-axis. Pairs of guide air bearings 76a,b, 78a,b, are interposed between each of the guide bearing legs 67, 68, and a respective guide surface 72, 74.

The guide bearing pairs 76a,b, 78a,b, are likewise spaced apart in the direction of the X-axis.

The granite slab 22 extends beneath a granite spacer block 25 bonded thereto and supporting the rotary work table 20.

An X-axis carriage drive arrangement includes a spar and toothed belt assembly 80 extending along the X-axis and passing through the central space between the brackets 50, 52, 54, and legs 67a,b, and 68a,b. The details of the X-axis carriage drive arrangement are disclosed in copending U.S. application Ser. No. 07/320,189 filed on Mar. 7, 1989.

Respective wires for motor power control, transducer signal leads, etc., are formed into cables 81, which are looped in the spaces above the slab 22 and within the way members 24, 26, attached to move easily back and forth with the carriage 40.

Figure 3:
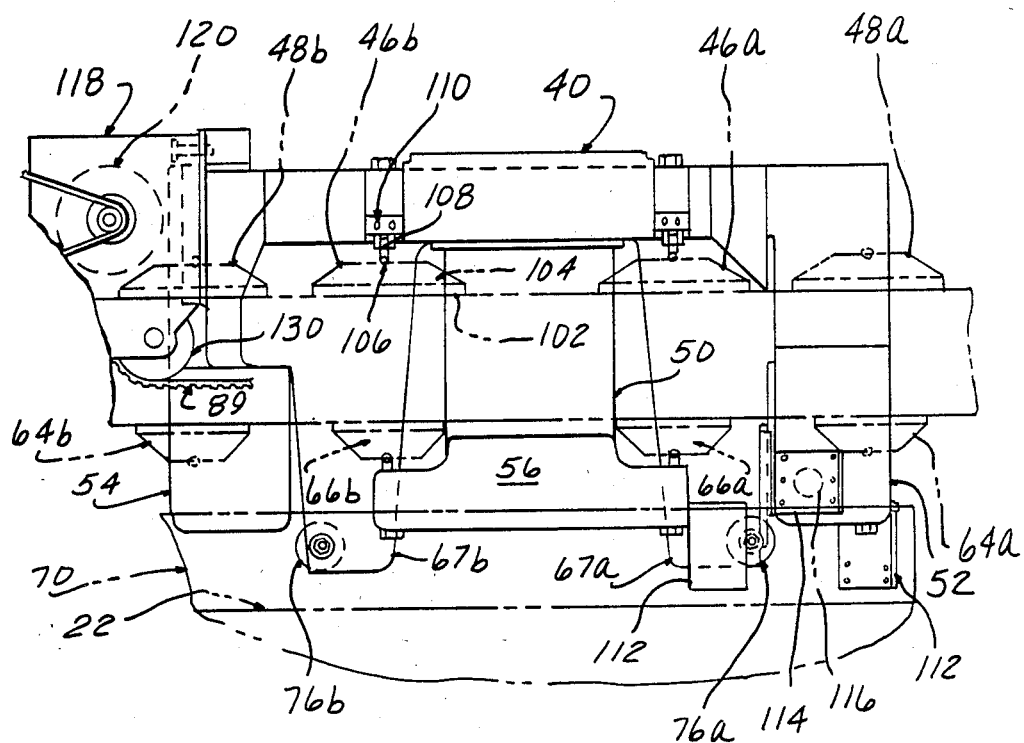
FIG. 3 is a fragmentary rear elevational view of the X carriage and attached components, with portions of the X axis ways and guide rail shown in phantom.

FIG. 3 shows that the bottom portion 56 of the rear bracket 50 is relatively wide and supports both rear air preloading bearings 66a,b, which are relatively closely spaced, as are the rear support air bearings 46a,b, in comparision to the front preload and support bearings 64a,b, and 48a,b. This approximates a three point support of the carriage 40 on the ways 32,34,36,38 to lessen the requirement for precise parallelism therebetween.

Each of the air bearings is of a well known design utilized in coordinate measuring machine commercially marketed heretofore. These include a porous bearing pad 102 as of graphite carried by a bearing cap 104 having an internal space supplied with compressed air by plumbing connections (not shown), which air flows out through the porous bearing pad 102 to create an air film providing a bearing support in the well known manner. The cap 104 is supported on a ball 106 received in a conical seat in an adjustable position pin 108 fixed by a clamping bar 110. This arrangement allows slight tilting of the bearing cap 104 and pad 102 to accommodate slight variations in the surface of the way. The air film gap is adjusted by adjusting the position of the pin 108.

Cable holder brackets 112 are attached to the left end of the left hand front preload bearing brackets 52 and the left end of the rear bearing support bracket 50 to which an attached one end of the cables loops 81.

A grating transducer mounting bracket 114 secures the reading head 116 to the left rear guide bearing leg 67a in proper position to scan the grating attached to the grating spar 71.

The carriage drive includes a motor-pulley drive package 118 attached to the left hand end of the carriage as viewed in FIG. 3, including a drive motor 120. Rotation of the drive motor 120 in either direction acting through a pulley system (not shown) causes linear advance of the X-axis carriage 40 in either direction along a toothed belt 89 included in the spar and toothed belt assembly 80 extending along the X-axis, as described in detail in the aforementioned copending U.S. patent application.

Figure 4:
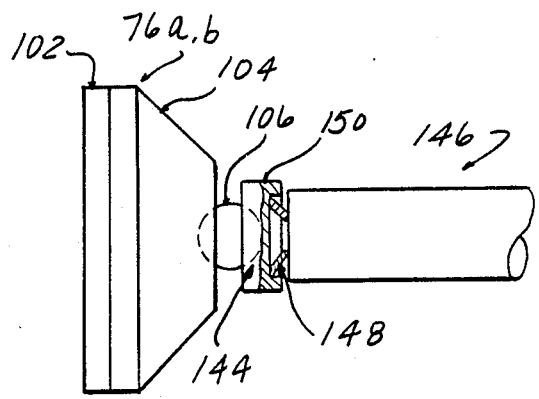
FIG. 4 is an enlarged fragmentary view of a preload guide air bearing included in the X-axis carriage assembly.

FIG. 4 shows certain details of the support for the rear guide air bearings 76a,b. The self aligning ball 106 is received in a seat 144 supported by a spring washer 148 secured on base 150 at one end of preload pin 146 to exert a preloading pressure against the opposing guide air bearings 78a,b. Thus, variations in spacing between the bearings 76a,b and 78a,b respectively, due to thermal growth in the rail 70, and X carriage 40, are taken up to prevent seizing or excess looseness of the bearings 76a,b, and 78a,b.

Figure 5:
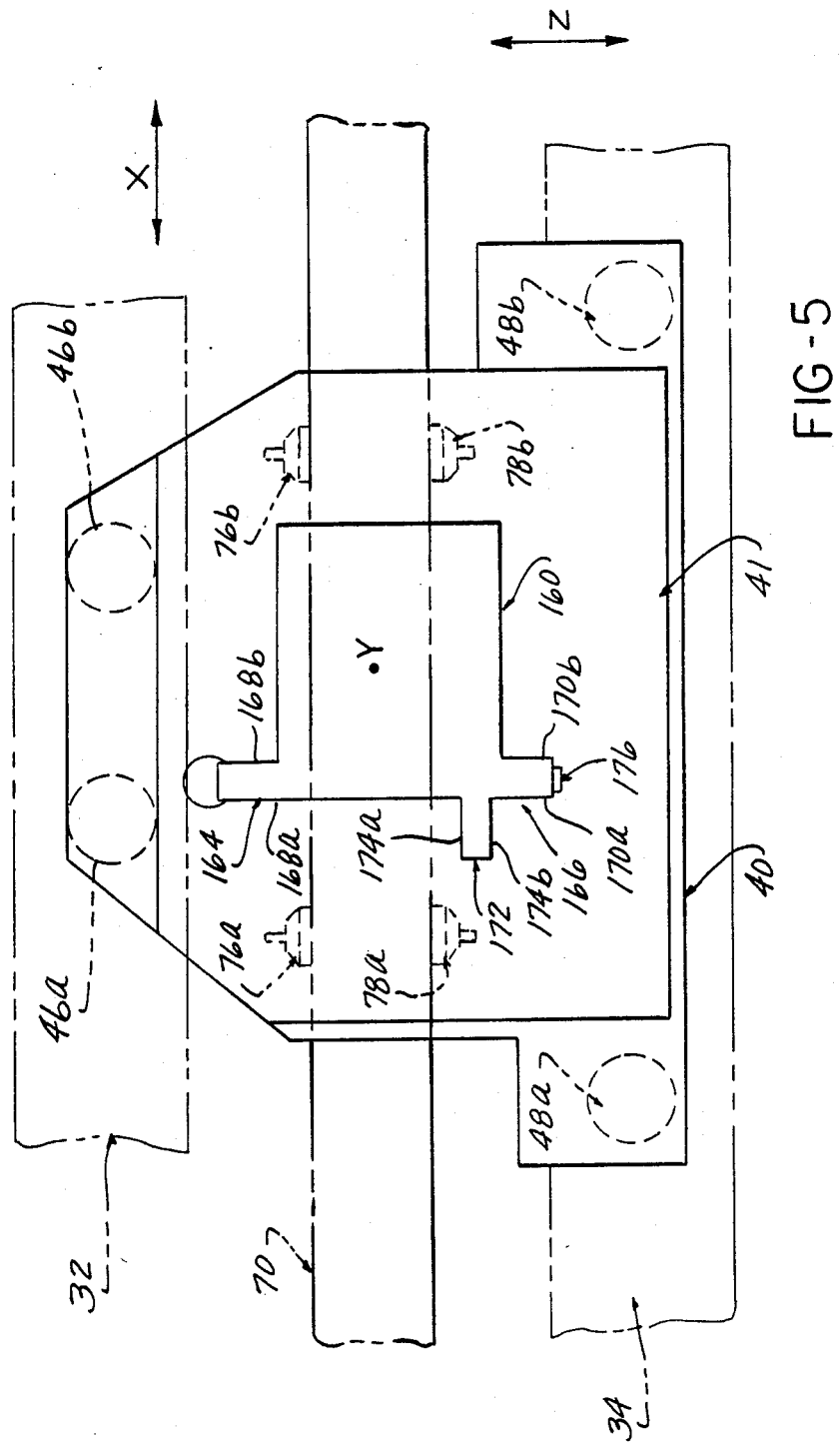
FIG. 5 is a diagrammatic plan view of the X-carriage and supporting bearings, including an outline of the column and attachment plate, and the X-axis ways and guide rails shown in phantom.

FIG. 5 illustrates diagrammatically the plan locations of the X carriage bearings. The preloading guide air bearings 76a,b, are located on the rear side of the guide rail 70, while the guide bearings 78a,b, are located to the front, near the rotary table 20.

The widely spaced support air bearings 48a,b, are located to the front, while the closely spaced support air bearings 46a, b, are located to the rear side of the X-axis carriage 40.

The front pair of support air bearings 48a,b, and the corresponding preloading air bearings 64a,b, are widely spaced along the X-axis to effectively resist the dynamic tipping loads created by acceleration of the X-carriage 40 in either direction along the X-axis.

The rear pair of support air bearings 46a,b, and the corresponding preloading air bearings 66a,b, are closely spaced to approximate a three point support to minimize the effects of inaccuracies in the ways 32, 34, 36, and 38. At the same time, these closely spaced bearings, bearings 46a,b, and 66a,b, absorb and counter the front-to-rear tipping dynamic loads tending to rotate the column assembly 14 about the front edge of the x rail 34 and 38, generated by movement of the probe arm assembly 16, and thereby the dynamic loads are effectively shared between the front and rear sets of air bearings.

Also shown in FIG. 5 is an outline of the column member 160 included in the column assembly 14, fixed to the X-carriage 40 by an attachment plate 41 secured to the base of the column member 160. The column member 160 is formed at the front and back side respectively with front to rear extending wings comprising way projections 166, 164 having laterally spaced way surfaces 168, 170 accurately machined thereon.

A rib comprising a third way projection 172 extends transversely to the front and rear projections 166, 164 in the X-axis direction, and has spaced way surfaces 174 machined thereon. Preferably, the Y-axis grating 176 is affixed to the joining face intermediate the way surfaces 170 of projection 166.

Figure 6:
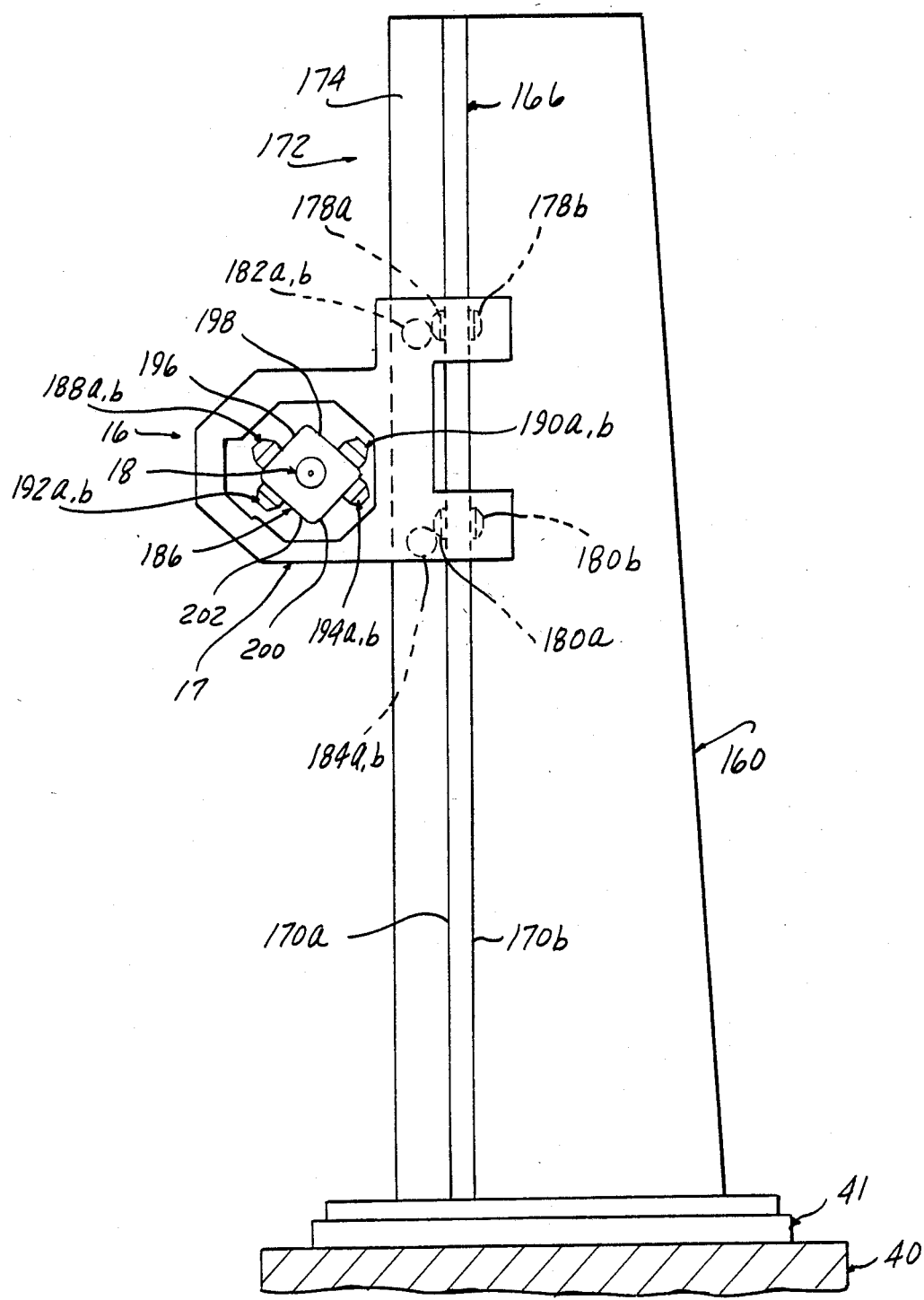
FIG. 6 is a diagrammatic front elevational view of the column, YZ carriage, and probe arm, illustrating the bearing placements.

FIG. 6 shows that the column member 160 is tapered from top to bottom to maximize its stiffness to resist bending induced by acceleration along the X-axis. The YZ carriage 17 carries two vertically spaced pairs of opposing air bearings 178a, b, and 180a, b, engaging the respective ways 170a, 170b.

Two vertically spaced opposing pairs of air bearings 182a, b, and 184a, b, engage the way surfaces 174a, b, of way projection 172.

The probe arm assembly 16 includes a square in section probe shaft 186 rotated to present a diamond shape. The probe shaft 186 is supported on front to rear spaced pairs of upper air bearings 188a,b, and 190a,b, and front-to-rear spaced pairs of lower air bearings 192a,b, and 194a,b, only one of each pair visible in FIG. 6. The air bearings 188a,b; 190a,b, 192a,b; 194a,b, are carried by the YZ carriage 17 to support the probe shaft 186 therein and engage respective way surfaces 196, 198, 200, and 202 formed by accurately machined sides of the diamond shaped probe shaft 186.

Figure 7:
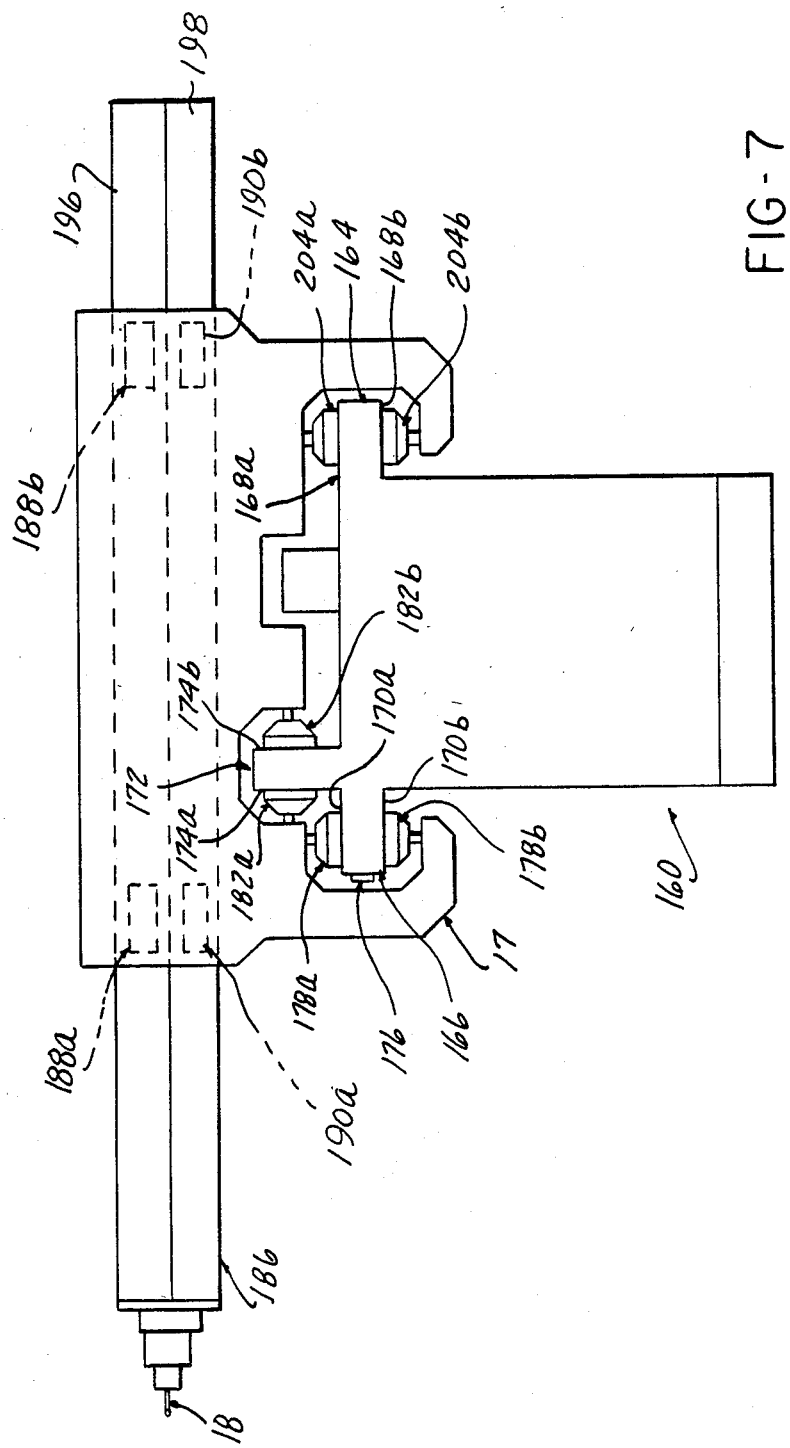
FIG. 7 is a diagrammatic plan view of the YZ carriage, column, and probe arm illustrating the various associated bearing placements.

FIG. 7 shows that an additional single pair of opposing air bearings 204a,b, engage the respective way surfaces 168a, b, of the rear way projection 164.

The air bearing pairs 182a,b, (and 184a,b, not viewable in FIG. 7) respectively engage opposite surfaces 174a,b, of way projection 172 and air bearing pairs 178a,b, (and bearings 180a,b, not visible in FIG. 7) respectively engage opposite surfaces 170a,b, of way projections 166.

The use of the separate way projection 172 for the air bearings sets 182a,b, and 184a,b to guide movement of the YZ carriage 17 in the vertical plane allows the use of larger bearings than those possible by merely engaging end faces of the front to rear projections 166, 164 as is conventionally done. Furthermore, it is much easier to machine the opposite way surfaces 174a,b so as to be in close parallelism with each other to reduce manufacture costs. The location of the projection 172 is closely adjacent to the front side of the column member 160 to minimize errors in the grating 176 and Y reading head, due to inaccuracies in the way surfaces 174a,b.

Figure 8:
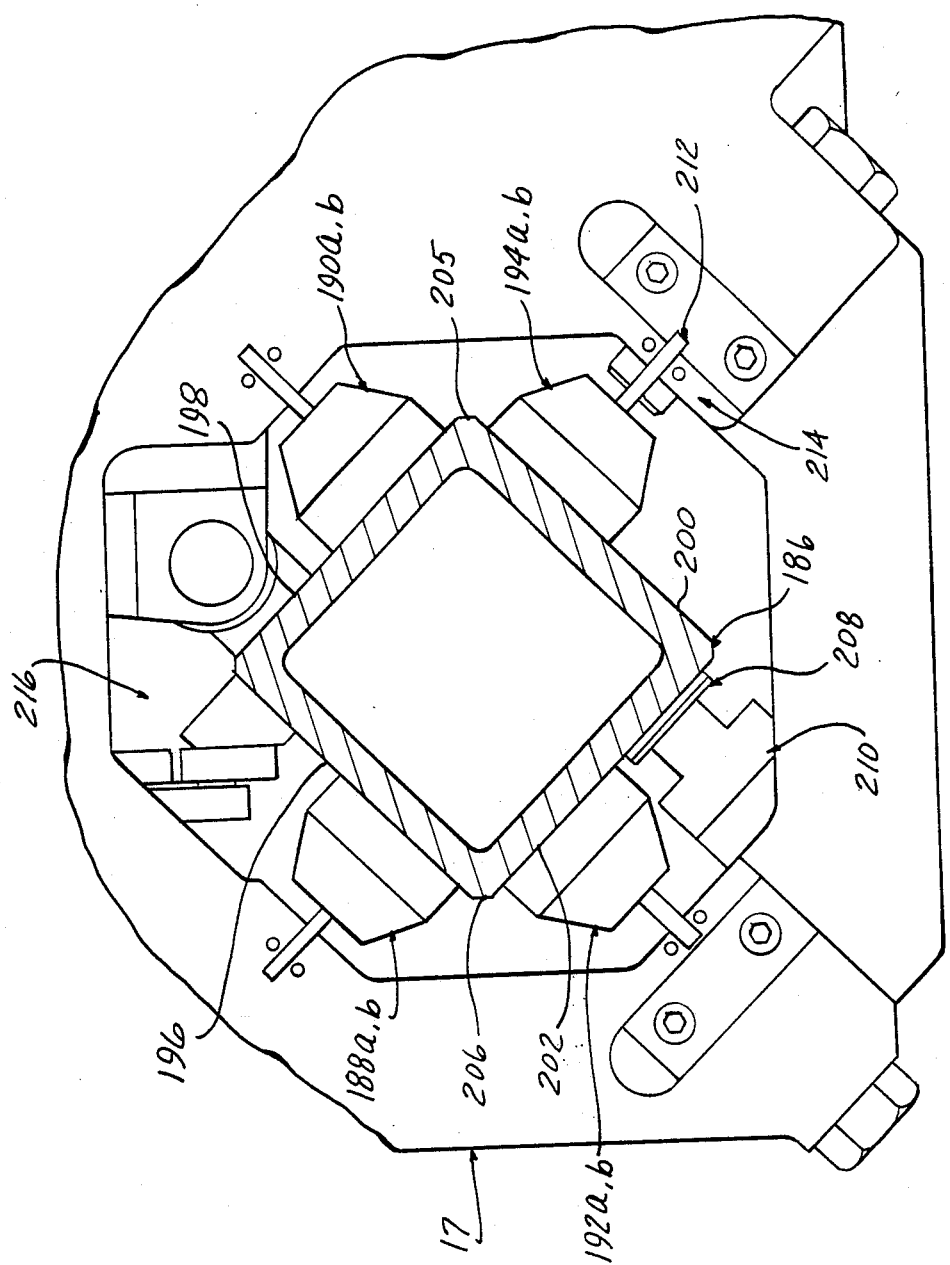
FIG. 8 is an end view of the probe shaft and fragmentary adjacent portions of the YZ carriage, illustrating the air bearing placement for guiding the probe arm Z-axis movement.

FIG. 8 shows that the air bearings sets 190a,b, 194a,b, are closely adjacent the right corner 205 of the probe shaft 186 and the air bearing sets 188a,b, and 192a,b, are closely adjacent the left corner 206 of the probe shaft 186. The resulting symmetry about the vertical axis eliminates the tendency to produced unbalanced twisting forces as the probe shaft 186 is moved in and out along the Z axis, which would occur if the probe shaft 186 was not in a rotated position to create the diamond configuration. The position of the air bearings close to the corners of the probe shaft 186 is necessary to most effectively resist rotation of the probe shaft 186. At the same time, providing the 45° way surfaces 196-202 is most easily achieved by rotation of the probe shaft 186 rather than machining 45° surfaces into a normally oriented rectangular in section probe shaft 186.

A optical grating 208 is preferably affixed on a lower surface 200 to minimize dust accumulation if a cover is not used, with a reading head 210 fixed to the YZ carriage 17.

A drive mechanism 216 enables powered movement of the probe arm assembly 16 in the YZ carriage 17.

FIG. 7 shows that the air bearings 188a,b; 190a,b, (and sets 192a,b, 194a,b not visible in FIG. 7) are rectangular in shape, and therefore as shown in FIG. 8, antirotation pins 212 are installed, restrained by pins 214 in the YZ carriage 17.

We claim:

1. In combination with a coordinate measuring machine (10) of the type including a base (12) having way surfaces (32, 34, 36, 38, 72, 74) extending along a horizontal axis including a first pair of horizontal parallel spaced apart way surfaces (32, 34), an X-carriage (40), X-carriage bearing means supporting and guiding said X-carriage (40) for movement along said ways (32-38), and comprising a plurality of X-carriage support bearings (46a,b; 48a,b; 66a,b; 64a,b; 76a,b; 78a,b) mounted on said X carriage (40);

a vertical column assembly (14) including a column member (160) attached to said X-carriage (40) extending vertically up therefrom to move along said X-axis therewith;

a probe assembly (16) including a probe tip (18) for contacting workpieces, and an elongated probe shaft (186) extending horizontally from said column assembly (14) orthogonally to said X-axis; way surfaces (196-202) formed along the length of said probe shaft (186) extending along a horizontal Z-axis; probe bearing means supporting and guiding said probe shaft (186) for movement along said probe shaft way surfaces (196-202) comprising a plurality of probe support bearings (188a,b; 190a,b; 192a,b; 194a,b) mounted on said YZ carriage;

said column member (160) having way surfaces (168a,b; 170a,b; 174a,b) extending along a vertical Y-axis; a YZ carriage (17); YZ carriage bearing means supporting and guiding said YZ carriage (17) for movement along said column member way surface (168 a,b; 170a,b; 174a,b) comprising a plurality of YZ carriage support bearings (204a,b; 180a,b; 184a,b; 182a,b; 178a,b) mounted on said YZ carriage (17);

a workpiece support table (20) located on one side of said X-axis way surfaces (32-38) defining the front of said machine (10) with the tip (18) of said probe assembly (16) extending to the front of said machine (10);

characterized by said X carriage support bearings including a spaced apart front located pair of air bearings (48a,b) riding on one of said horizontal parallel way surfaces (34) located on the front side of said X-axis and a relatively closely spaced rear pair of air bearings (46a,b) located on the rear side of said X-axis and spaced apart a distance less than the spacing of said front pair.

2. The coordinate measuring machine according to claim 1 wherein said X-axis way surfaces further include a second pair of spaced apart horizontal way surfaces (36, 38) located beneath said first pair of spaced apart way surfaces (32, 34) and wherein said X carriage bearings further include a corresponding preloading air bearing (66a,b; 64a,b) upwardly facing X-axis beneath each of said front and rear support air bearings (48a,b; 46a,b).

3. The coordinate measuring machine according to claim 2 wherein said X-axis way surfaces further include a pair, of vertical way surfaces (72, 74) extending along said X-axis located intermediate said first and second pair of horizontal way surfaces (32-38).

4. The coordinate measuring machine according to claim 1 wherein said column member (160) is formed with vertically-extending opposite way projections (166, 164) on the front and rear sides thereof and wherein way surfaces (170a,b; 168a,b) are formed on opposite sides of each front and rear way projection (166, 164); said YZ carriage bearings include a first pair of oppositely facing air bearing pairs (178a,b; 180a,b; 204a,b) positioned along each of said front and rear projections (166, 164) against a respective way surface (170a, b; 168a,b); an intermediate way projection (172) vertically extending along a lateral side of said column member (160) adjacent the front way projection (166), said lateral way projection (172) having front and rear way surfaces (174a,b) formed thereon; and wherein said YZ carriage bearings include a pair of oppositely facing air bearings (182a,b; 184a,b) each positioned against a respective way surface (174a,b) on said lateral projection (172).

5. The coordinate measuring machine according to claim 4 further including a second pair of air bearings vertically spaced oppositely facing from said first pair and positioned against said way surfaces of said front way projection (166) and a second pair of oppositely facing air bearings vertically spaced from said first pair positioned against said way surface (174a, b) of said lateral way projection (172).

6. The coordinate measuring machine according to claim 1 wherein said probe shaft (186) is square in section and is oriented to present a diamond shaped section having a right and left apex (205, 206), each defined by one corner of said square section; wherein said way surfaces (196-202) are comprised of the sides of said square section; and, wherein said probe support bearings (188a, b; 190a,b; 192a,b; 194a,b) are comprised of air bearings located adjacent each right and left apex (205, 206) of said diamond shape.

7. The coordinate measuring machine according to claim 6 wherein said probe shaft support bearings (188a,b; 190a,b; 192a,b; 194a,b) comprise sets of four spaced apart along the length of said probe shaft (186); each set comprised of a pair of air bearings (188a, 190a, 192a, 194a, 188b, 190b, 192b, 194b) grouped adjacent either side of the right and left diamond shape apexes (205, 206).

8. In combination with a coordinate measuring machine (10) of the type including a base (12) having way surfaces (32, 34, 36, 38, 72, 74) extending along a horizontal axis including a first pair of horizontal parallel spaced apart ways (32, 34), an X-carriage (40), X-carriage bearing means supporting and guiding said X-carriage (40) for movement along said ways (32-38, 72, 74), comprising a plurality of X-carriage support bearings (46a,b; 48a,b; 66a,b; 64a,b; 76a,b; 78a,b) mounted on said X carriage (40);

a vertical column assembly (14) including a column member (160) attached to said X-carriage (40) extending vertically up therefrom to move along said X-axis therewith;

a probe assembly (16) including a probe tip (18) for contacting workpieces, and an elongated probe shaft (186) extending horizontally from said column assembly (14) orthogonally to said X-axis; way surfaces (196-202) formed along the length of said probe shaft (186) extending along a horizontal Z-axis; probe bearing means supporting and guiding said probe shaft (186) for movement along said probe shaft way surfaces (196-202) comprising a plurality of probe support bearings (188a,b; 190a,b; 192a,b; 194a,b) mounted on said YZ carriage;

said column member (160) having way surfaces (168a,b; 170a,b; 174a,b) extending along a vertical Y-axis; a YZ carriage (17); YZ carriage bearing means supporting and guiding said YZ carriage (17) for movement along said column member way surface (168a,b; 170a, b; 174a, b) comprising a plurality of YZ carriage support bearings (204a, b; 182a, b; 180a,b; 184a,b; 178a,b) mounted on said YZ carriage (17);

a workpiece support table (20) located on one side of said X-axis way surfaces (32-38) defining the front of said machine (10) with the tip (18) of said probe assembly (16) extending to the front of said machine (10);

characterized, by said column member (160) formed with vertically extending opposite way projections (166, 164) on the front and rear sides thereof and wherein way surfaces (170a, b; 168a,b) are formed on opposite sides of each front and rear way projection (166, 164); said YZ carriage bearings include a first pair of oppositely facing air bearing pairs (178a, b; 180a, b; 204 a,b) positioned along each of said front and rear projections (166, 164) against a respective way surface (170a, b; 168a, b); an intermediate way projection (172) vertically extending along a lateral side of said column member (160) adjacent the front way projection (166), said lateral way projection (172) having front and rear way surfaces (174a,b) formed thereon; and wherein said YZ carriage bearings include a pair of oppositely facing air bearings (182a,b; 184a,b) each positioned against a respective way surface (174a,b) on said lateral projection (172).

9. The coordinate measuring machine according to claim 8 further including a second pair of air bearings vertically spaced oppositely facing from said first pair and positioned against said way surfaces of said front way projection (166) and a second pair of oppositely facing air bearings vertically spaced from said first pair positioned against said way surface (174a, b) of said lateral way projection (172).

10. In combination with a coordinate measuring machine (10) of the type including a base (12) having way surfaces (32, 34, 36, 38, 72, 74) extending along a horizontal axis including a first pair of horizontal parallel spaced apart ways (32-34), an X-carriage (40), X-carriage bearing means supporting and guiding said X-carriage (40) for movement along said ways (32-38), comprising a plurality of X-carriage support bearings (46a,b; 48a,b; 66a,b; 64a,b; 76a,b; 78a,b) mounted on said X carriage (40);

a vertical column assembly (14) including a column member (160) attached to said X-carriage (40) extending vertically up therefrom to move along said X-axis therewith;

a probe assembly (16) including a probe tip (18) for contacting workpieces, and an elongated probe shaft (186) extending horizontally from said column assembly (14) orthogonally to said X-axis; way surfaces (196-202) formed along the length of said probe shaft (186) extending along a horizontal Z-axis; probe bearing means supporting and guiding said probe shaft (186) for movement along said probe shaft way surfaces (196-202) comprising a plurality of probe support bearings (188a,b; 190a,b; 192a,b; 194a,b) mounted on said YZ carriage;

said column member (160) having way surfaces (168a,b; 170a,b; 174a,b) extending along a vertical Y-axis; YZ carriage (17); YZ carriage bearing means supporting and guiding said YZ carriage (17) for movement along said column member way surface (168 a,b; 170a,b; 174a,b) comprising a plurality of YZ carriage support bearings (204a,b; 180a,b; 184a,b; 182a,b; 178a,b) mounted on said YZ carriage (17);

a workpiece support table (20) located on one side of said X-axis way surfaces (32-38) defining the front of said machine (10) with the tip (18) of said probe assembly (16) extending to the front of said machine (10);

characterized by said probe shaft (186) being square in section and oriented to present a diamond shaped section having an right and left apex (205, 206), each defined by one corner of said rectangular section; wherein said way surfaces (196-202) are comprised of the sides of said square section; and, wherein said probe support bearings (188a,b; 190a,b; 192a,b; 194a,b) are comprised of air bearings located adjacent each right and left apex (205, 206) of said diamond shape.

11. The coordinate measuring machine according to claim 10 wherein said probe shaft support bearings (188a,b; 190a,b; 192a,b; 194a,b) comprise sets of four spaced apart along the length of said probe shaft (186); each set comprised of a pair of air bearings (188a, 190a, 192a, 194a, 188b, 190b, 192b, 194b) grouped adjacent either side of the right and left diamond shape apexes (205, 206).

12. In combination with a coordinate measuring machine (10) of the type including a base (12) having way surfaces (32, 34, 36, 38, 72, 74) extending along a horizontal axis including a first pair of horizontal parallel spaced apart way surfaces (32-34), an X-carriage (40), X-carriage bearing means supporting and guiding said X-carriage (40) for movement along said ways (32-38), and comprising a plurality of X-carriage support bearings (46a,b; 48a,b; 66a,b; 64a,b; 76a,b; 78a,b) mounted on said X carriage (40);

a vertical column assembly (14) including a column member (160) attached to said X-carriage (40) extending vertically up therefrom to move along said X-axis therewith;

a probe assembly (16) including a probe tip (18) for contacting workpieces, and an elongated probe shaft (186) extending horizontally from said column assembly (14) orthogonally to said X-axis; way surfaces (196-202) formed along the length of said probe shaft (186) extending along a horizontal Z-axis; probe bearing means supporting and guiding said probe shaft (186) for movement along said probe shaft way surfaces (196-202) comprising a plurality of probe support bearings (188a,b; 190a,b; 192a,b; 194a,b) mounted on said YZ carriage;

said column member (160) having way surfaces (168a,b; 170a,b; 174a,b) extending along a vertical Y-axis; a YZ carriage (17); YZ carriage bearing means supporting and guiding said YZ carriage (17) for movement along said column member way surface (168 a,b; 170a,b; 174a,b) comprising a plurality of YZ carriage support bearings (204a,b; 180a,b; 184a,b; 182a,b; 178a,b) mounted on said YZ carriage (17);

a workpiece support table (20) located on one side of said X-axis way surfaces (32-38) defining the front of said machine (10) with the tip (18) of said probe assembly (16) extending to the front of said machine (10);

characterized by said X carriage support bearings including a spaced apart front located pair of air bearings (48a,b) riding on one of said horizontal parallel way surfaces (34) located on the front side of said X-axis and a rear pair of air bearings (46a,b) located on the rear side of said X-axis, a second pair of spaced apart horizontal way surfaces (36, 38) located beneath said first pair of spaced apart way surfaces (32, 34) and wherein said X carriage bearings further include a corresponding preloading air bearing (66a,b; 64a,b) upwardly facing X-axis beneath each of said front and rear support air bearings (48a,b; 46a,b), said preloading air bearings (66a,b; 64a,b) offset slightly inwardly from said support air bearings (46a,b; 48a,b).

* * * * *